United States Patent [19]

Bowman

[11] Patent Number: 5,671,838
[45] Date of Patent: Sep. 30, 1997

[54] APPARATUS FOR CLEANING OF CONVEYORS

[76] Inventor: John H. Bowman, 9740 S. Meade Ave., Oak Lawn, Ill. 60453

[21] Appl. No.: 626,354

[22] Filed: Apr. 2, 1996

[51] Int. Cl.$^6$ ................................................. B65G 45/18
[52] U.S. Cl. ............................................................ 198/496
[58] Field of Search ................................... 198/494, 496, 198/498

[56] References Cited

U.S. PATENT DOCUMENTS

| 554,912 | 2/1896 | Derrenberger | 198/230 |
|---|---|---|---|
| 574,621 | 1/1897 | McCulloch et al. | |
| 575,520 | 11/1897 | Grupelli | |
| 1,111,752 | 9/1914 | Lichtenstein et al. | 198/229 |
| 1,255,977 | 2/1918 | Bemis, Sr. | 198/230 |
| 1,791,728 | 2/1931 | Linfesty | 198/496 |
| 1,883,223 | 10/1932 | Wood | |

(List continued on next page.)

FOREIGN PATENT DOCUMENTS

| 0 448 080 A1 | 3/1991 | European Pat. Off. | 45/24 |
|---|---|---|---|
| 1558069 | 3/1968 | France | 198/496 |
| 673721 | 3/1939 | Germany | |
| 2057673 | 3/1972 | Germany | 198/496 |
| 0680726 | 10/1992 | Switzerland | 198/496 |
| 24334 | of 1897 | United Kingdom | 474/92 |
| 11285 | of 1897 | United Kingdom | 474/92 |
| 11606 | of 1897 | United Kingdom | 474/92 |
| 765866 | 11/1951 | United Kingdom | 19/35 |
| 2174350 | 11/1986 | United Kingdom | 198/496 |

OTHER PUBLICATIONS

Drawings from application 08/190,318.
Drawings from application 08/190,311.
Industrial Finishing, Part II, Equipment, pp. 5, 56, Nov. 1984.
Finishing Coatings Manufacturing & Application, cover and p. 51, Nov. 1985.
Brochure, Who Makes a Better Cleaner? No One!, Airogap Company (6 pp.).
Brochure, Typical Installation in a Major Midwest Manufacturing Company, Airogap Company (4 pp.), #1.
Brochure, Typical Installation in a Major Midwest Manufacturing Company, Airogap Company (4 pp.), #2.
Where should you look to remedy poor grounding, excessive overspray, over–deposition and fallout problems from dirt–tube buildup? No higher than your conveyor... and no wider than Airogap! (1 pg.).
Airogap Company, *We are proud to introduce* Enclosed Trac Power and Free Cleaners and price sheet (2 pp.).
*We are proud to introduce the* Dyan Enclosed Track Power and Free Cleaners and price sheet (2 pp.).

*Primary Examiner*—James R. Bidwell
*Attorney, Agent, or Firm*—Leydig, Voit & Mayer

[57] ABSTRACT

Multiple conveyor cleaning assemblies are mounted on a section of the support rail of a large chain conveyor, with each assembly including one or more long-bristled brushes for cleaning the chain as it moves through that rail section. The side cleaners are mounted on supports which are readily swingable between their chain-engaging cleaning positions and retracted positions wherein the brushes are withdrawn from the chain and related structures for ready removal and replacement of the cleaning heads. A single latch bolt holds each of these side cleaners in the cleaning position. Further, each cleaning head is engaged on its respective support by simple slide engagement in the direction of movement of the contacted conveyor chain whereby the frictional engagement of the chain holds the cleaner in its cleaning position on the support without further attachment between the cleaning head and its support. A top cleaner includes three brushes mounted on one holder such that their bristle axes converge for cleaning the upward projecting top portions of the chain components. Multiple provisions are made for adjusting each of the brushes in its operative position.

36 Claims, 9 Drawing Sheets

U.S. PATENT DOCUMENTS

| | | | |
|---|---|---|---|
| 1,942,590 | 1/1934 | Binger | 198/231 |
| 2,083,864 | 6/1937 | Puckett | 198/230 |
| 2,295,798 | 9/1942 | McKinley | 15/246 |
| 2,491,401 | 12/1949 | Tucker et al. | 198/230 |
| 2,804,194 | 8/1957 | Carlson et al. | 198/230 |
| 2,915,019 | 12/1959 | Tieman | 104/279 |
| 3,139,975 | 7/1964 | Schaefer | 198/496 |
| 3,229,808 | 1/1966 | Olson | 198/229 |
| 3,434,273 | 3/1969 | Lovell | 57/56 |
| 3,643,785 | 2/1972 | Bostedt | 198/75 |
| 3,819,032 | 6/1974 | Preuss et al. | 198/180 |
| 3,858,715 | 1/1975 | Brock et al. | 198/229 |
| 3,935,610 | 2/1976 | Vogt | 15/21 R |
| 4,091,192 | 5/1978 | Thomson et al. | 15/246 |
| 4,176,429 | 12/1979 | Rottensteiner | 26/93 |
| 4,257,517 | 3/1981 | MacPherson et al. | 198/497 |
| 4,416,367 | 11/1983 | Easton et al. | 198/496 |
| 4,514,872 | 5/1985 | Hopkins | 15/256.5 |
| 4,678,075 | 7/1987 | Bowman, Jr. | 198/496 |
| 4,787,500 | 11/1988 | Holz | 198/497 |
| 4,960,200 | 10/1990 | Pierce | 198/495 |
| 5,333,724 | 8/1994 | Wingfield et al. | 198/495 |

APPARATUS FOR CLEANING OF CONVEYORS

This invention relates to apparatus and methods for cleaning of endless conveyors. More particularly, this invention pertains to the cleaning of conveyor chains such as conveyor chains used to move parts, carts and assemblies in manufacturing, assembling or painting operations.

BACKGROUND OF THE INVENTION

Conveyors are widely used for conveying a variety of products, including discrete items or assemblies as well as bulk materials. In many instances some of the materials coming in contact with the conveyor will cling or adhere thereto. These materials may include product fines or trimmings, excess product, excess finishing materials, or extraneous materials from other sources such as accumulations of lubricants or dirt, and may include adherent liquids such as paints. All such materials are encompassed by the term "debris" hereinafter. The retention or accumulation of such debris on the conveyor usually is undesirable or unacceptable. Accordingly, removal is desirable or necessary as a condition of continued operations or to enhance efficiency of continued operations and may require periodic shut-down of the operation of the system for cleaning purposes.

Examples of such conveyance operations occur in the instance of flexible conveyor chains used in manufacturing, assembling or painting operations. Dirt, paint, lubricants such as grease and oil, by themselves or more usually in combination with other debris, or other debris, may accumulate on such chains and on the pusher dogs, latches or carriers which often are included in or on such chains. Thus, in a variety of instances debris may adhere to and accumulate on a conveyor incidentally or inherently during its operation in accordance with its intended use.

The problem of adherence and accumulation of debris typically is enhanced when the product being handled or the environment of use exposes the conveyor to oils, lubricants, paints or other adherent materials. Desirable operating practices also render it advantageous to be able to readily and safely dismantle the cleaning mechanism for cleaning and/or for replacement, even while the conveyor chain remains in motion.

A clean chain conveyor requires substantially less power to operate the conveyor than one which is carrying a substantial quantity of debris adhered to the various components.

Many previous efforts to clean conveyors have involved considerable hand labor and/or shut-down of the conveyor line for general cleaning purposes.

It is an object of this invention to provide improved apparatus for cleaning endless conveyors.

It is another object of this invention to provide improved apparatus and methods for continuous cleaning of endless conveyor chains while in operation.

It is a further object of this invention to provide for easy and quick insertion, removal and replacement of conveyor cleaning heads in such conveyor cleaning apparatus.

It is another object of this invention to provide for convenient removal and replacement of conveyor cleaners, and particularly for removal and replacement of long-bristled brushes used for cleaning conveyors, while the conveyors are in use.

It is an object of this invention to provide improved cleaners for cleaning conveyor chains while those conveyors are in use in their normal conveying operation, and particularly for cleaning large conveyor chains in such manner.

It is another object of this invention to provide chain cleaners which are preassembled with sections of conveyor rail for insertion into existing chain conveyor systems.

It is a further object of this invention to provide cleaners for conveyor chains which may be installed on an existing conveyor line without breaking the conveyor chain.

SUMMARY OF THE INVENTION

The present invention provides for mounting a conveyor cleaning head in a predetermined cleaning position on a support head, adjacent the conveyor, by providing a freely retractable support for the cleaning head. The support is readily moveable between an operative position wherein the cleaning head is engaged with the conveyor and a retracted position wherein the cleaning head is well clear of the conveyor. The cleaning head is readily removable and replaceable while the support is so retracted. The support head is latched in its engagement position and preferably swings freely to its retracted portion when unlatched.

Multiple cleaning heads according to this invention may be used together or separately for cleaning a single conveyor. The mounting plane of each cleaning head preferably is parallel to the conveyor surface which it is to clean as the conveyor moves through the cleaning station in contact with the cleaning elements. Each such cleaning head may be oriented with its major plane vertical, horizontal or at other orientations.

The preferred embodiments of the cleaning heads include long-bristled brushes to be positioned in contact with a large conveyor chain. Preferably these are elongated brush sets each arranged with its longitudinal axis generally parallel to the direction of movement of the chain and with its bristles substantially perpendicular to the chain as it passes therealong. In a preferred embodiment for cleaning large conveyor chains, multiple such brushes are so mounted on each of separate cleaning heads provided on each side of the chain. Preferably all of the brushes are mounted on one short section of the rail which can be inserted into an existing conveyor chain rail. However, all of the components also may be mounted on an existing chain rail with appropriate mountings and adaptations.

In a preferred apparatus, a cleaning head for at least one surface of the chain slides into support engagement on a support head by movement generally in the direction of movement of the portion of the conveyor which is contacted by that cleaning head. An abutment stop on the cleaning head seats against the support head to limit the engagement movement. The frictional engagement of the moving conveyor with the cleaning elements holds the cleaning head in its assembled cleaning position, whereby further attachment or securement devices are not necessary for holding the cleaning head in its engagement with the support. The cleaning head may be removed for cleaning, replacement or the like simply by sliding it in the opposite direction while the support is retracted, without requiring tools and with minimal or no downtime in the use of the conveyor.

Other brush assemblies may be included for cleaning other surfaces of a chain. In a preferred embodiment at least one of these other brush assemblies comprises a nest of multiple brushes arranged such that the axes of their bristles are mutually convergent with one another.

Other objects and advantages of the invention will become apparent upon consideration of the following detailed description and appended claims, and upon reference to the accompanying drawings.

DETAILED DESCRIPTION OF EMBODIMENTS OF THE INVENTION

Figure 4:
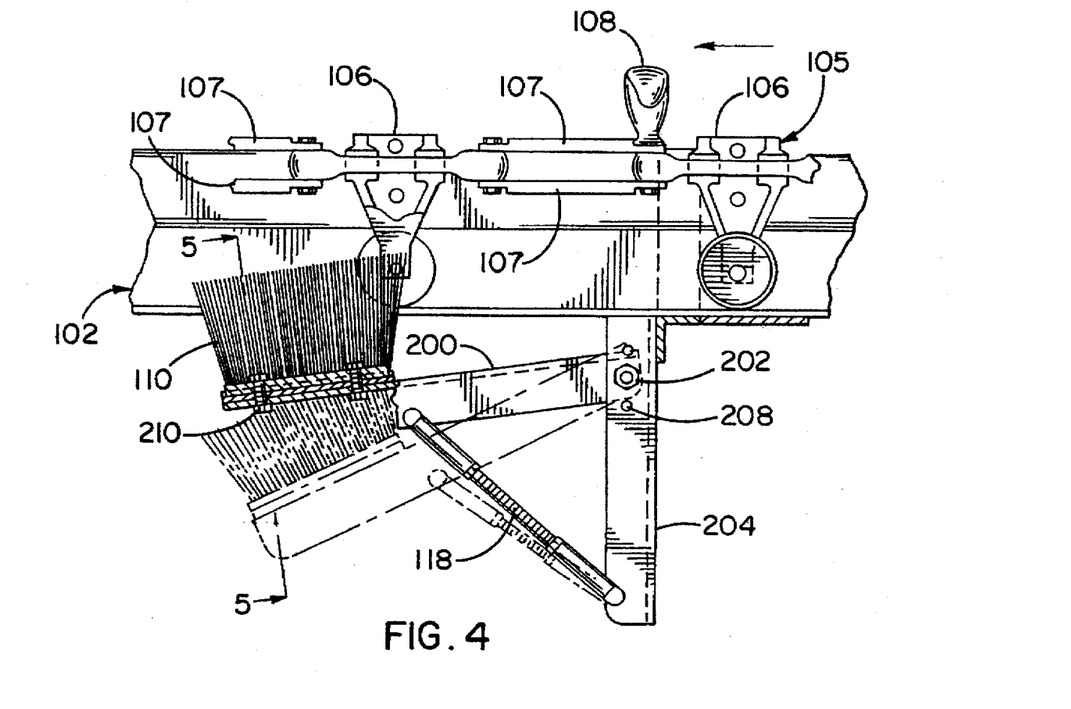
FIG. 4 is a sectional view taken generally along line 4—4 of FIG. 3, and illustrating a portion of a conveyor chain in the box rail section as well as a retracted position of the bottom cleaner brush in phantom lines.
Figure 5:
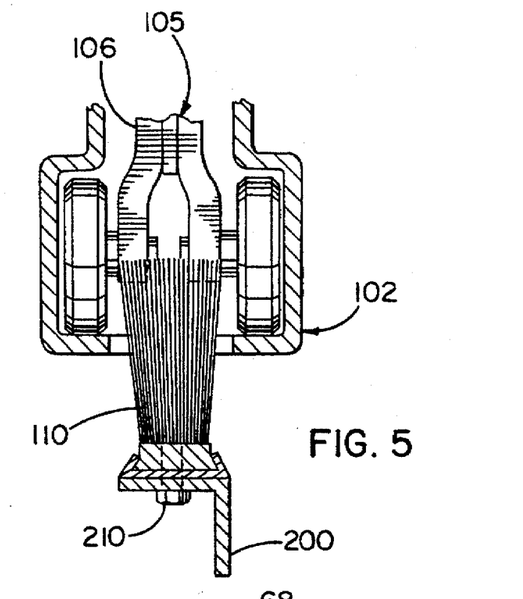
FIG. 5 is a partial sectional view taken generally along line 5—5 of FIG. 4.

In general, the conveyor cleaning assembly 100 illustrated in FIGS. 1–10 includes a short length of a box rail 102 for interposition in a long box rail 104 such as is installed in many manufacturing plants. Such a box rail typically carries an endless conveyor chain 105 of the type that includes a series of trolley elements 106 which are linked to one another by links 107 in an endless series, see FIGS. 4, 5 and 8. Certain of these trolleys or the intervening chain links carry latch heads or pusher heads at spaced intervals along the chain for carrying individual parts or pallets or to serve as pushers or pullers for carts or subassemblies that may be propelled by the chain 106. One such head 108 on a trolley 106 is seen in FIG. 4 and another in phantom within the upper brush in FIG. 6. Such chains are well known in the art of chain conveyors. The channel section 102 conforms in cross section to the main conveyor channel 104 except that major portions of the bottom wall preferably are omitted, either by cutting away the bottom wall in various areas or by forming the length of rail channel 102 from two spaced side portions 103A and 103B. The purpose is to provide adequate open space for much of the debris which is removed from the chain by the cleaning assembly to fall through the bottom of the channel.

Figures 1, 2:
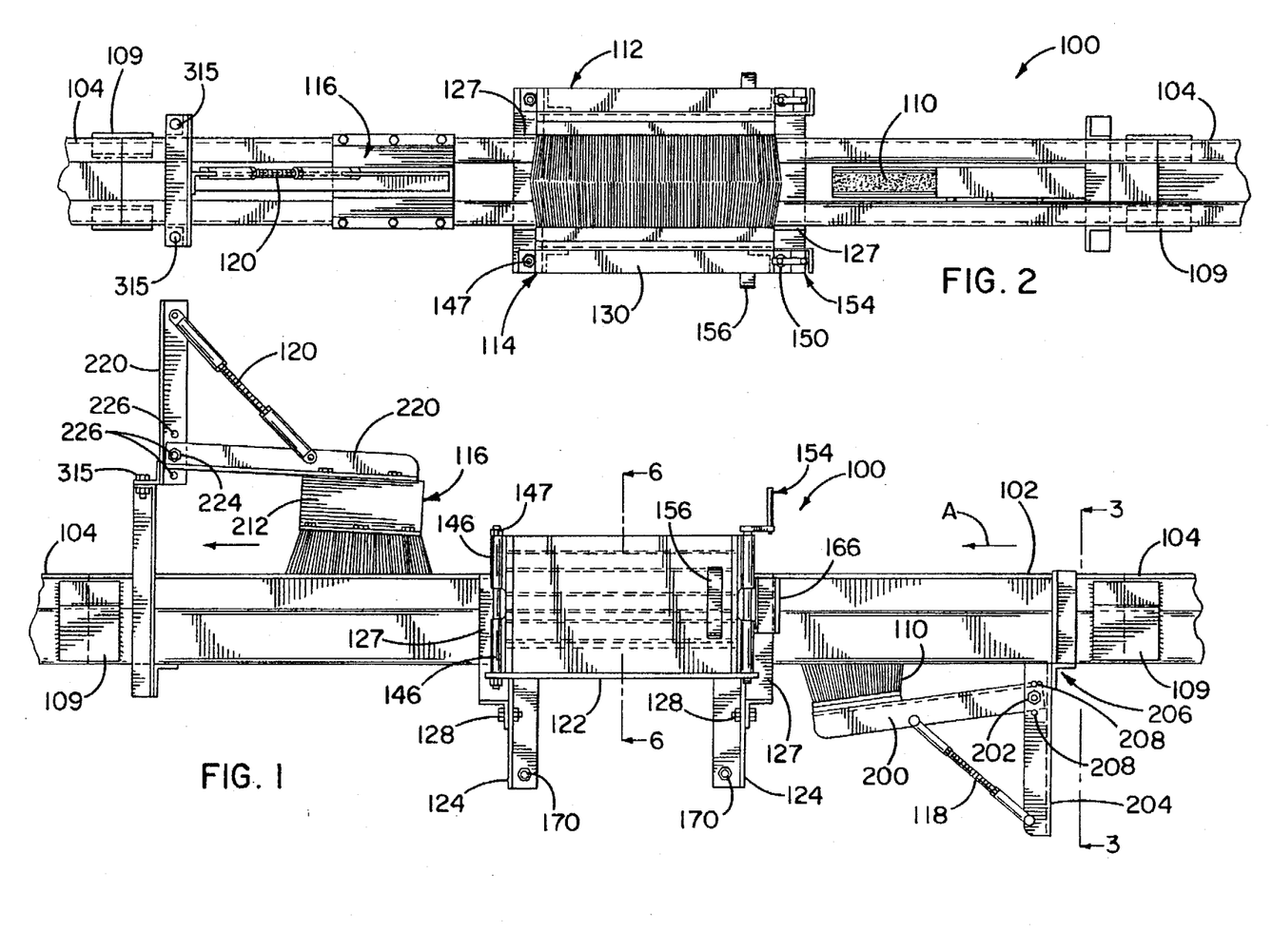
FIG. 1 is a side view of a conveyor chain cleaning assembly employing teachings of this invention.
FIG. 2 is a top view of the assembly of FIG. 1.
Figure 3:
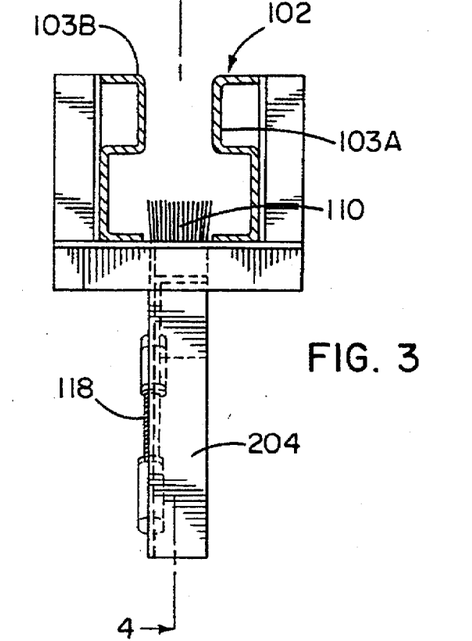
FIG. 3 is a sectional view taken generally along line 3—3 of FIG. 1, showing the bottom cleaner brush.

The cleaning assembly 100 includes four sets of cleaning brushes, namely a bottom brush 110, two opposing side cleaning brush assemblies 112 and 114, and a top cleaning brush 116. The bottom brush 110 is a single brush element for cleaning generally the lower portions of the trolleys and the related chain links. The upper brush assembly 116 comprises three brushes, including a center brush 117C oriented with its bristles extending essentially vertically downward and two converging side brushes 117R and 117L for cleaning the tow lugs 108 and top structures of the trolleys and links. The bottom and top brushes 110 and 116 are pivotally mounted for generally vertical adjustment by clevised turnbuckles 118 and 120 similar to the mounting shown and described in my U.S. Pat. No. 4,678,075, which also is incorporated herein by reference.

In each of the side brush assemblies 112, 114, the brushes 164 have bristles of substantial length to provide the reach and flexibility to extend through the rail wall and to engage and clean the numerous and various complex surfaces of the large conveyor chain 105. The resulting extension of those bristles across the rail walls and portions of the chain present substantial problems in safely removing and replacing the brushes, such as often is desirable or necessary in the course of cleaning operations, especially in removing and replacing the brushes without stopping the conveyor chain, i.e., while the conveyor chain remains in operation. These brushes are mounted by slide engagement of the respective cleaning head assembly 160, described further below, on its support head structures 130, also described further below. Both the support head and the cleaning head are oriented in vertical planes, with provisions for the mounting and adjustability of the support structures and hence of the supported cleaning heads. The manner of engagement of the cleaning heads on the support heads and the structure and mounting of the respective brush elements also are disclosed in my copending application entitled "Apparatus For Cleaning Conveyors" filed concurrently herewith as Ser. No. 08/627,736 (Attorney Ref. No. 66283). The disclosure of that application is incorporated herein by reference.

Figure 6:
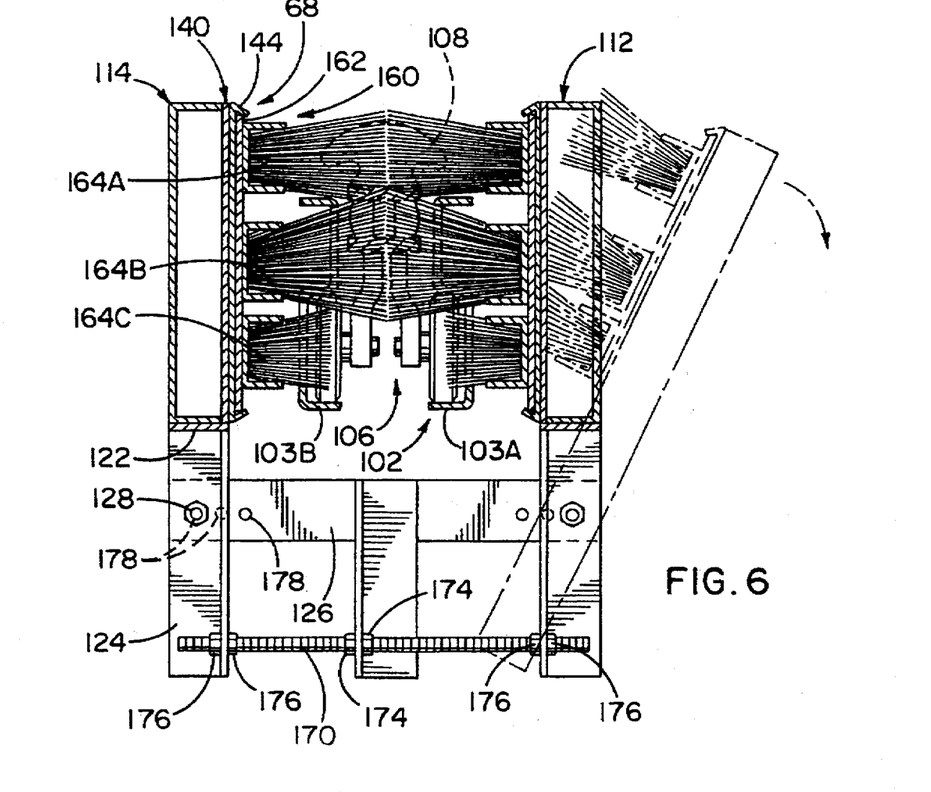
FIG. 6 is a sectional view taken generally along the line 6—6 of FIG. 1 and illustrating one side cleaning assembly tilted outward in the adjustment mode in phantom lines.

An assembly 114 is described hereinafter in some detail, it being understood that the assembly 112 is a mirror image thereof. The assembly 114 includes a subframe 120 that is pivotally mounted on the rail 102 for pivotal movement about a longitudinal axis that is parallel to the longitudinal axis of the rail. To this end, each subframe 120 includes a horizontal plate 122 that is affixed to the upper ends of two short vertical angle-iron legs 124, as by welding. Each of these vertical legs 124 is pivotally mounted on a transverse angle bracket 126 that is affixed to a vertical support plate 127 which is affixed to the adjacent side of the rail 102, as by welding in each instance. This pivotal mounting is effected by a pair of axially aligned pivot bolts 128 which extend through the respective legs 124 and brackets 126, as illustrated, and which thereby define the horizontal pivot axis of the subframe 120 and thus of the assembly 114.

A support head 130, which is oriented generally in a vertical plane, is pivotally mounted at one end on the plate 122. The illustrated support head 130 comprises a generally rectangular welded subassembly comprising a framework 132 formed of angle irons to which is welded a retainer plate 140. The retainer plate includes a planar base plate 142 with opposed converging edge flanges or lips 144. The framework 130 also includes a pair of aligned sleeves 146 at its trailing end. A pivot rod 147 extends through these sleeves and through an opening 147A at the downstream end of the plate 122 for pivotally supporting the support head 130. Thereby the cleaning head assembly 114 may be swung freely about a generally vertical axis between the closed operative position of FIGS. 1, 2, 6 and also shown in solid lines in FIG. 7, and an open position as illustrated in phantom lines in FIG. 7 as well as in solid lines in FIG. 8 wherein the support and cleaning head are removed and displaced from the conveyor. A similar pair of sleeves 148 secured to the leading edge of the support 130 receive a vertical securement bolt 150 for selective threaded engagement with an opening 152 in the opposite end of the plate 122. The bolt 150 preferably includes a crank arm 154 or the like at its upper end for convenient manual engagement and disengagement of the bolt 150 with the plate 122 when the support 130 is in its closed position. A handle 156 is provided on the outer side of support head 130 near its leading edge to facilitate gripping for manual swinging of the assembly 114 between its closed and open positions.

Figure 8:
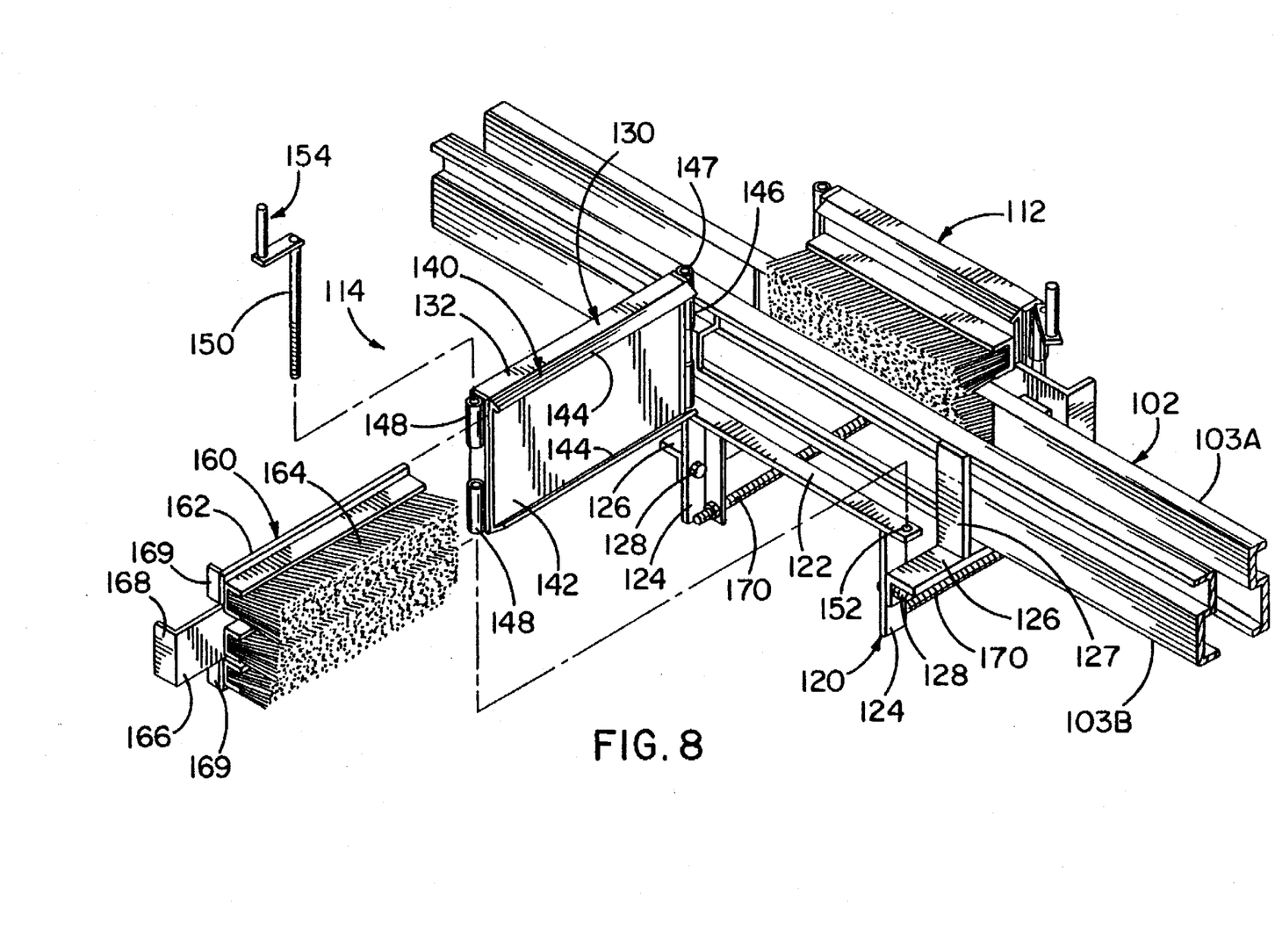
FIG. 8 is a view similar to FIG. 7 with the nearer side assembly shown in an exploded perspective view.

The assembly 114 further comprises a cleaning head assembly 160 that includes a base plate 162. Three sets of brushes 164 are mounted on the plate 162 in the manner described below and in my aforementioned copending application. An L-shaped extension 166 is provided at the leading edge of the plate 160 to provide a laterally extending gripping flange 168 which is spaced from the adjacent elements of the assembly 114 to permit ready grasping by an operator for removal and/or replacement of a cleaning head assembly 160 on the support structure 130. Flanges 169 on the leading edge of the plate 162 provide abutment stops against the leading edge of the support head 130 to limit the sliding seating engagement movement of the cleaning head 160 onto the support head 130.

Figure 7:
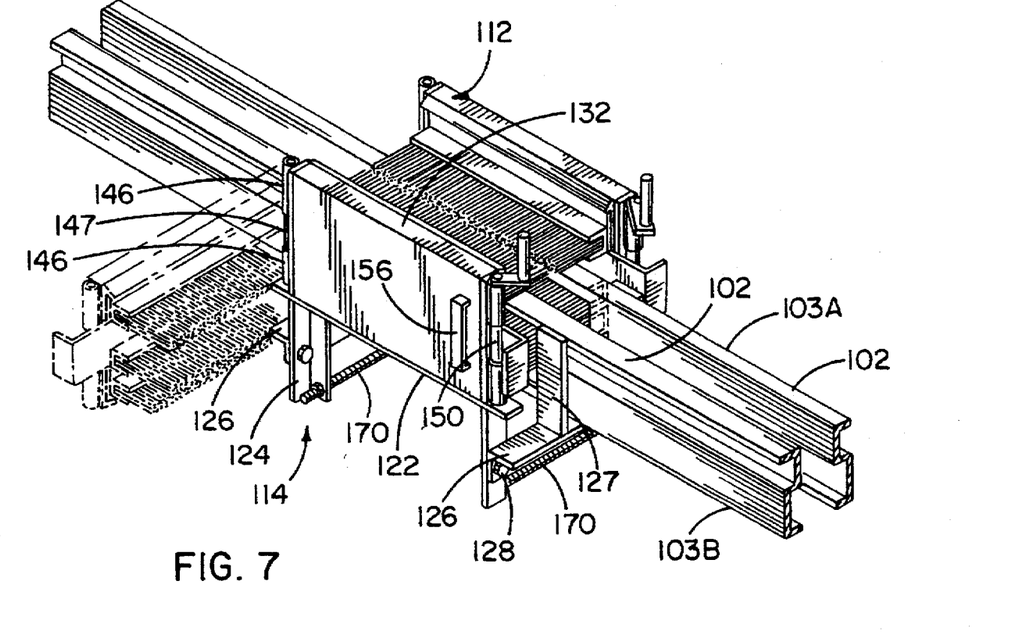
FIGS. 7 is a perspective view of the side cleaning assembly of FIG. 1, and with the nearer side assembly shown swung to its open position in phantom lines.

It will be appreciated that the pivoting of the support head 130 for swinging between its closed operative position and the open position illustrated in phantom in FIG. 7 as well as in FIG. 8 effectively extracts the bristles from the rail and related support structure. This frees the brushes and provides ready access for safe and convenient removal and replacement of the cleaning head assembly free of interference with other components of the cleaning assembly 100 as well as from engagement with the chain and related mechanism within the channel 102.

The assembly 114 also may be tilted about the horizontal axis through bolts 128 to afford convenient fine adjustment of the support head 130 and thus of the lateral engagement positioning of the brushes 164 when the support and cleaning head are in their closed operative positions for cleaning a conveyor chain and related structure as the latter moves along the channel section 102. In the assembly 100, this tilting is effected by threaded rods 170 which extend through the depending legs 124. The rods 170 are secured to a stationary bracket 172 beneath the rail 102 by nuts 174; see FIG. 6. Nuts 176 adjustably affix each leg 124 to the respective rod 170 at a point spaced well below the pivot axis through the bolts 128. Multiple laterally spaced holes 178 may be provided through the bracket 126 for each pivot bolt 128 to provide gross lateral adjustment of support head 130, such as for basic adjustment for use of cleaning heads with brush bristles of different lengths either by virtue of the specific brushes being used or to provide general adjustment as the bristles wear to shorter lengths.

Figures 13, 15:
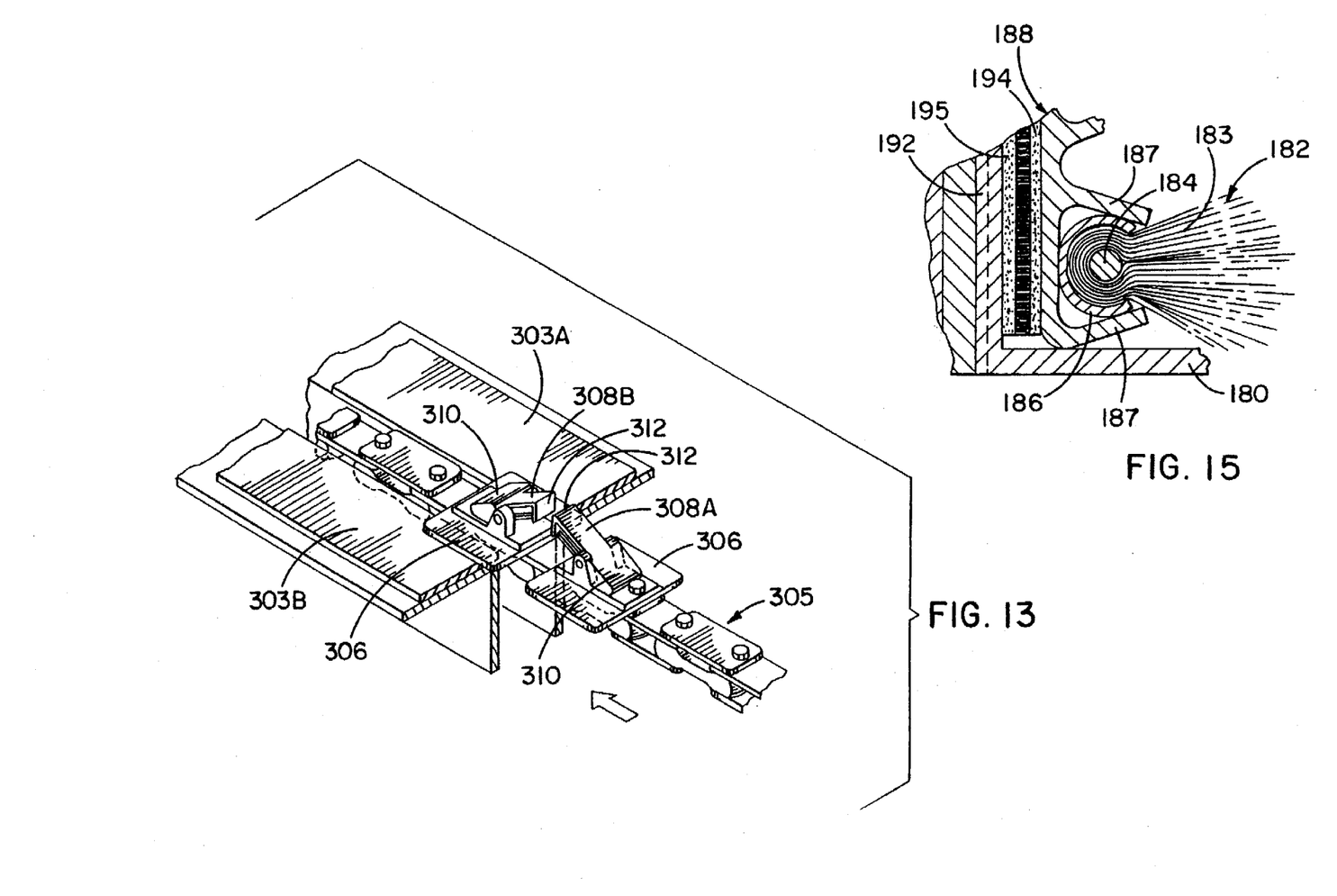
FIG. 13 is a perspective view illustrating a portion of the support rail section of the cleaning assembly of FIG. 11 and a portion of a conveyor chain such as is cleaned by the chain cleaning assembly.
FIG. 15 is an enlarged sectional partial view of a portion of one of the brushes of the illustrated conveyor cleaning assemblies.
Figure 14:
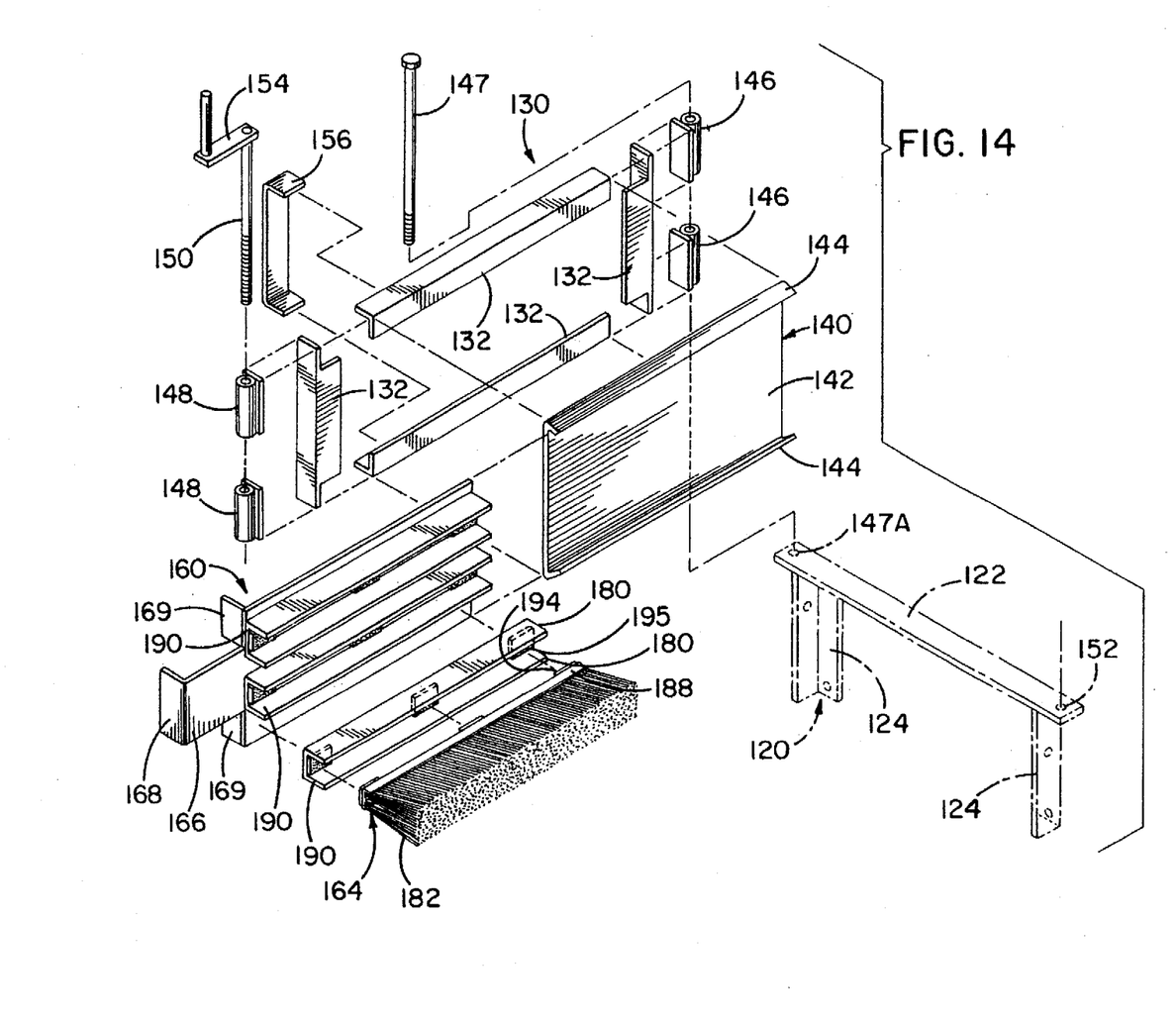
FIG. 14 is an exploded view of the components of one of the side cleaning assemblies of FIG. 1.

Referring particularly to FIGS. 14 and 15, in the illustrated embodiment 100 each brush 164 of the side cleaners is mounted between a pair of parallel side support walls 180 which extend over a substantial portion of the height (length) of the bristles 182 to provide lateral support to outer portions of the brush bristles while allowing space between the walls for flexing of the individual bristles during the cleaning operations. Each of the brushes 164 comprises two parallel brush subassemblies each formed by an elongated row of U-shaped strands 183 with their bights passing about a center rod 184 and clamped in a U-shaped base 186. The base of each brush subassembly is secured between opposed sets of ribs 187 of an extruded metal base holder strip 188. Further, each set of walls 180 are generally parallel legs of a U-shaped channel member 190 which includes a base leg 192 joining the respective upstanding support legs 180. Each brush 164 is removably secured in place in the respective channel 190 by an appropriate detachable latching means, e.g. by sections 194 of attachment material adhered to the inner surface of base leg 192 and mating attachment sections 195 adhered to the bottom surface of the base holder strip 192. One example of an appropriate securing mechanism is short sections of Dual Lock® adhesive-backed fastening tape currently marketed by Minneapolis Mining and Manufacturing Company of St. Paul, Minn. which tape has fields of mushroom-shaped plastic heads that interlock when pressed together.

All of the support channels 190 are affixed to the base plate 162, as by welding thereto, to form the cleaning head assembly 160 which includes the three brushes 164 that are labeled 164A, 164B and 164C in FIGS. 6 and 8. The base plate 160 is slidably received and retained within the shallow U-shaped retainer plate 140 of the support structure 130. The opposed converging edge flanges or lips 144 provide sliding retentive engagement over the opposite lateral edges of the base plate 162 to slidably retain the brush assembly in position on the support head structure 130.

The support head structure 130 is disposed and mounted in a manner whereby the retainer plate 140 is oriented with the retainer flanges 144 extending generally parallel to the direction of movement of the adjacent portion of the conveyor chain being cleaned. Further the cleaning head is slidably engaged onto the support head structure 130 in this same direction of movement, with the ends of the brushes 44 in frictional brushing engagement with the adjacent surfaces of the chain structure. While the conveyor chain is moving in its normal conveyance manner, the frictional engagement of the adjacent portion of the chain with the brush components applies transverse forces to the cleaning head in the direction of movement of this portion of the chain. Those forces tend to hold the cleaning head in its fully seated position wherein the flanges 169 abut the subjacent support head structure. This interaction maintains the cleaning head in its fully seated operational position, with no additional securement or retention devices such as bolts, pins or the like being required to secure the cleaning head in its operational cleaning position. Accordingly, after the support is moved to its open position, the cleaning head may be removed simply by sliding the head in an opposite direction, i.e., generally opposite to the direction of movement of the adjacent chain. In the illustrated preferred embodiment such removal may be effected by grasping and pulling on the exposed gripping flange portion 168. It will be observed that this removal and replacement operation thus may be carried out in a location which is safely removed from the conveyor chain.

Debris which is removed by the brushes tends to drop through or out of the rails for collection and removal from the site. Material remaining in a cleaner head is removed during the periodic cleaning of the cleaner components, as referred to further below.

In some installations, removal and thorough cleaning of the cleaner units is required. To effect removal of cleaning unit 160, the cleaning personnel or operator need only release the bolt latch 150, swing the respective support 130 to a retracted position and slide the entire cleaning head assembly 160 out of the unit. It will be appreciated that this involves a relatively simple removal of only the cleaning head components. The time for replacement may be minimized by having another corresponding cleaning head at hand for prompt replacement for the removed head by the simple slide-in technique permitted by the aforedescribed design. Appropriate cleaning of the support structure may be carried out before reinsertion of a head, as by wiping and/or washing same as necessary to the type of operation being conducted. These removal, cleaning and replacement operations can be effected without use of any tools.

Referring particularly to FIGS. 1, 3, 4 and 5, the bottom cleaning head brush 110 is mounted on the outer end of a bracket arm 200 which is pivotably mounted by a bolt 202 on an angle-iron bracket 204 which is supported in a generally vertical position beneath the rail 102. The bracket 204 is affixed to a frame or saddle 206 that is attached to the rail 102 as by welding. Multiple spaced holes 208 are provided for selective positioning of the pivot bolt 202 for general adjustment of the vertical position and angle of the support arm 200, and thus of the brush 110 which is affixed to the outer end of that arm as by bolts 210. The long bristles of the brush 110 project upward through the open bottom provided in rail 102 to engage the bottom surfaces of the conveyor chain mechanism, particularly in the area between the wheels of the trolleys 106. The clevised turnbuckle 118 extends between a pivot connection to the lower end of the bracket 204 and an outer portion of the bracket 200 for further adjustment of the position of the brush 110, as illustrated for example in FIG. 4.

Figure 9:
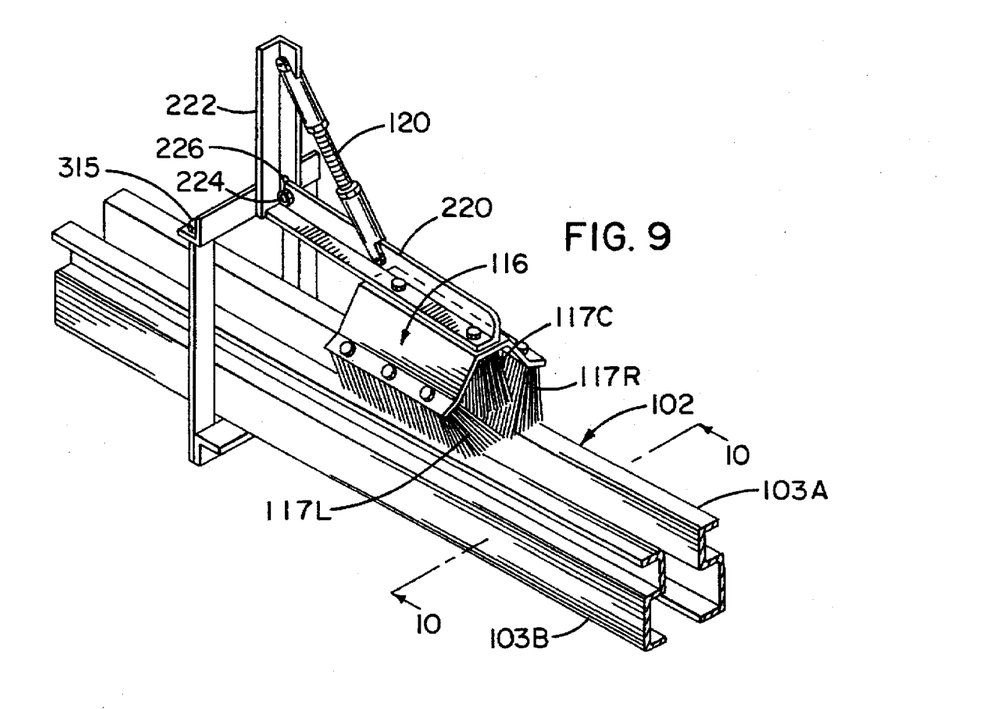
FIG. 9 is a perspective view of the top cleaner assembly of FIG. 1.
Figure 10:
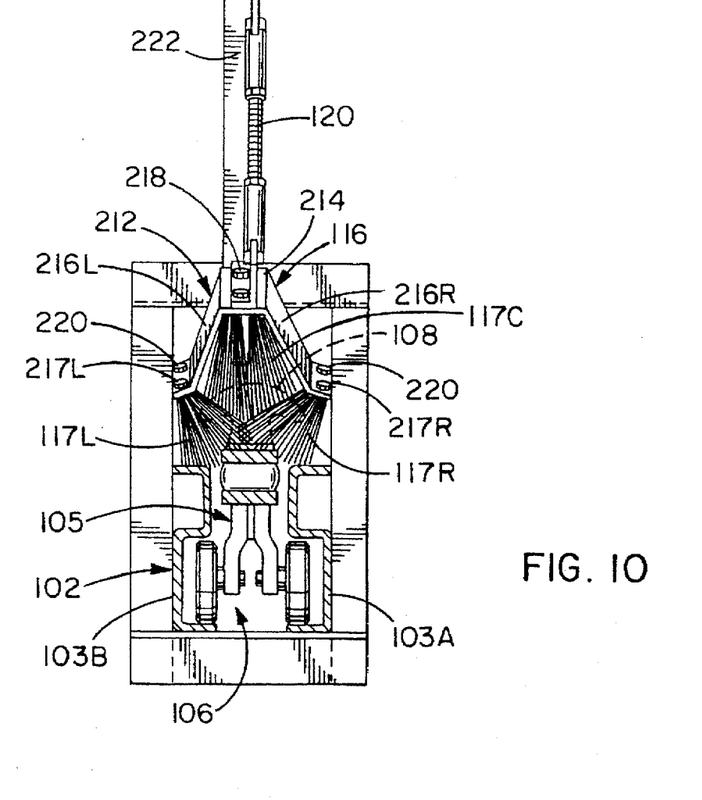
FIG. 10 is an elevation view, partially in section, taken generally along line 10—10 of FIG. 9 and illustrating a conveyor chain in the box rail section.

Referring now to FIGS. 1, 9 and 10, the top brush assembly 116 includes a nesting set of the three brushes 117C, 117R and 117L. These brushes are mounted with the central axes of their bristles in converging relationship with one another; see particularly FIG. 10. This configuration of the top brush assembly effects cleaning of the upper surface of the chain links as well as upwardly protruding components of the conveyor chain, such as the lugs 108, or other upwardly protruding components such as the lugs 308 of a conveyor chain as illustrated in FIG. 13. The cleaning head assembly 116 includes an elongated support housing 212 which is of a generally truncated triangular configuration in cross-section; see particularly FIG. 10. Thus, this housing includes an upper generally flat surface 214 which is joined with two diverging side walls 216R and 216L which terminate in a pair of flanges 217R and 217L. The flanges diverge from one another at a significantly greater angle than the angle between the walls 216. The center brush 217 is secured to the wall 214 by bolts 218 which also served to attach the housing 212 and thus the entire top brush assembly to a horizontal angle-iron support leg 220. The brushes 117L and R are secured to the respective flanges 217L and R as by bolts 220. The arm 220 is pivotally joined to a vertical support frame element 222 by a pivot bolt 224. Multiple spaced holes 226 are provided to selectively receive the bolt 224 for adjustment of the top cleaning assembly 116 in conjunction with a clevised turnbuckle 120 in substantially the same manner as described above with respect to the positioning of the lower brush 110. In one embodiment for cleaning a trolley chain 105, the bristles of the outer brushes 117L and 117R were longer than those of the center brush 117C, e.g. the bristles of brush 117C being 5" long while the bristles of the outer brushes were 6" long.

Figure 11:
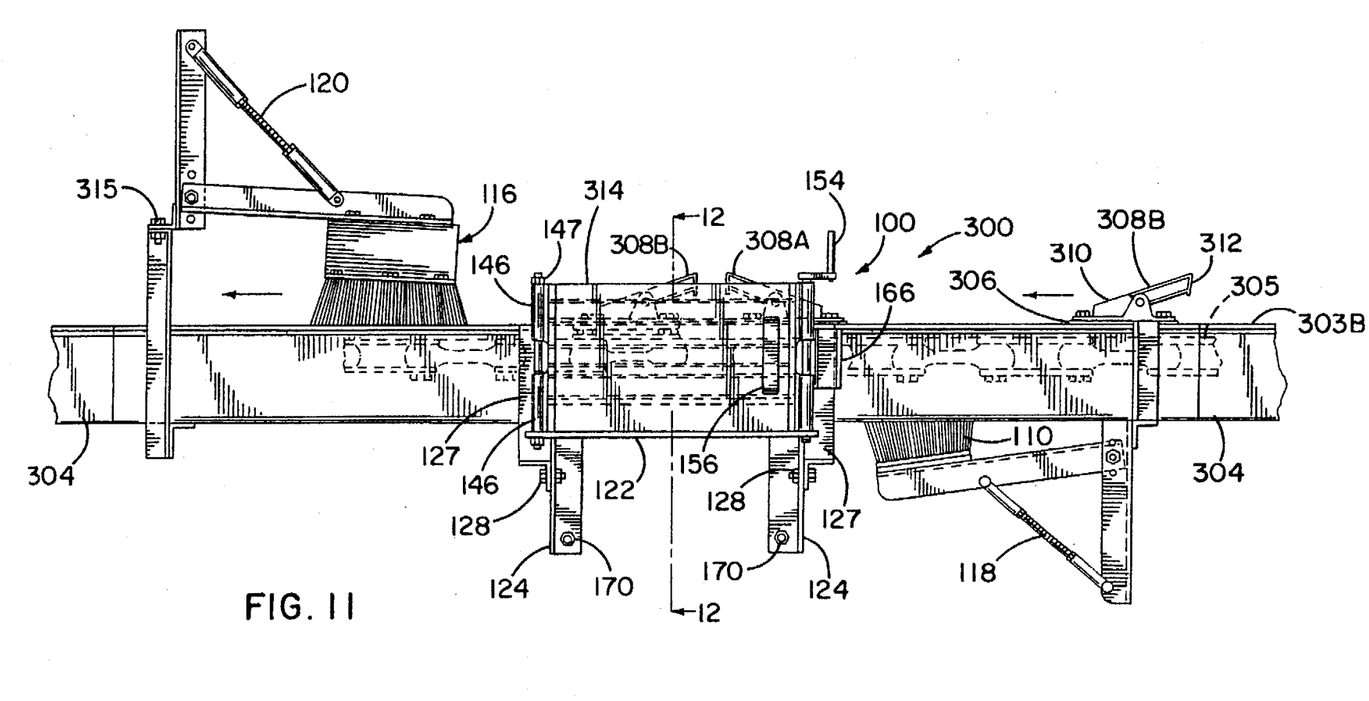
FIG. 11 is a side view, similar to FIG. 1, of another conveyor chain cleaning assembly employing teachings of this invention.
Figure 12:
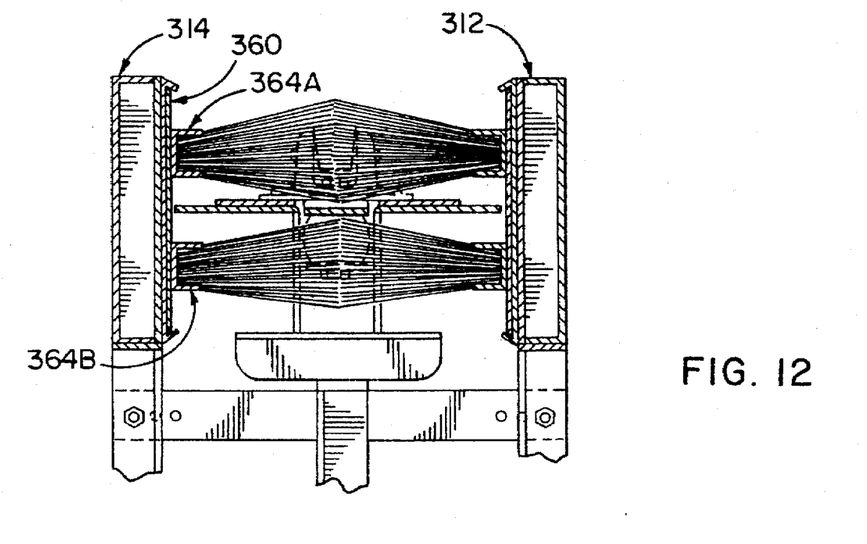
FIG. 12 is a partial sectional and partial elevation view taken generally along line 12—12 of FIG. 11.

FIGS. 11–13 illustrate another embodiment of a conveyor chain cleaning assembly 300. The assembly 300 is of a construction which is of substantially the same overall design and construction as the cleaner assembly 100. Hence many components are identified by the same numerals as used above. The assembly 300 differs primarily in its adaptation for cleaning a chain 305 which includes flat carrier plates 306 whereby the chain 305 is supported on laterally spaced flat slide rails 303A and 303B. The plates 306 carry pusher dogs 308A and 308B which are pivotally supported on the plates. The dogs 308 include counterweight portions 310 whereby pusher abutment surfaces 312 at their opposing ends normally are in a raised position for abutting engagement with a handle or lug on a cart or carrier device which is moved by the chain 305.

Side cleaning assemblies 312 and 314 are of substantially the same design, construction and operation as the cleaning assemblies 112 and 114 of the embodiment 100 except that only two brush subassemblies 364A and 364B are included in each cleaning head 360. The top and bottom cleaning brush assemblies 110 and 116 are essentially the same as in the embodiment 100, as indicated by the use of the same identifying numbers.

The cleaning assembly 300, like the cleaning assembly 100, preferably is prefabricated on a short section of the rails 303A and 303B which correspond in cross-section to the rails 304 of the conveyor chain system in which the cleaning assembly 300 is to be installed. However, it will appreciated that by appropriate configuration of the mounting subframes, the various cleaning components can be installed on an existing rail without necessitating the severance of the existing rail or chain. For example, this is facilitated by having certain of the frame components bolted together, such as is indicated by the bolts 315 which join the upper horizontal support bracket of the top cleaner assembly to the vertical brackets that straddle the rail. Other support brackets of each of the cleaning assemblies may be installed and affixed to the rail as by welding, without requiring severance of an existing conveyor system.

The preferred embodiments illustrated and described above are especially desirable for use in cleaning large conveyor chains. It will be appreciated that various aspects of the embodiments illustrated and described above may be varied in other installations. For example, more or less sets of brushes 164 may be included in the various cleaning heads though three sets is preferred for the aforedescribed side cleaners 112, 114 and for the top brush assembly 116, but two sets in each of the side cleaners 312 and 314 and only one brush set in the bottom brushes 110. Where multiple brushes and used in one cleaner head assembly, the spacing therebetween may be varied.

The length of the bristles also may be varied. For example, as seen in FIG. 6, the brushes 164C which engage the trolley wheels are shorter than the brushes 164A and 164B which engage the narrower link and head portions of the chain 105. It is believed that brushes with bristles about 2½" to about 7" long will be effective for cleaning various chain conveyors in similar structures. Straight bristles of about 0.014" diameter oil tempered steel wire presently are preferred for cleaning wet paint, for ease in cleaning the bristles, and for basic cleaning of heavily encrusted chains. Aluminum oxide bristles of 40 to 100 grit, preferably about 80 grit, are preferred for routine cleaning of oil, grease, dirt, paint and the like and thus for maintenance and even polishing of chain conveyors. Bristles which are bent in a zig-zag or "crinkled" manner along their lengths tend to provide less aggressive scratching action and more of a wiping action than straight bristles and are advantageous in many cleaning operations.

It will be seen that apparatus and methods for cleaning conveyors have been provided which meet the objects aforestated. While particular embodiments of the invention have been shown, it will be understood, of course, that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

What is claimed is:

1. A conveyor cleaning assembly for cleaning an endless conveyor as such conveyor moves in a predetermined direction along a portion of its path of movement, said cleaning assembly comprising:

a cleaning head which includes at least one cleaning element for engaging one or more surfaces of said conveyor and removing debris therefrom as said conveyor moves along said portion of its path in frictional engagement with said cleaning element, a support frame adjacent said conveyor, a head support on which said cleaning head is held for holding said cleaning head adjacent said portion of said path, said head support being mounted on said support frame for free movement between an engagement position on said frame wherein said cleaning head held on said head support is in cleaning engagement with said conveyor and a retracted position on said frame wherein said cleaning head held on said head support is clear of said conveyor, and a latch for selectively holding said head support in said engagement position and releasing said head support for free movement to said retracted position, whereby said cleaning head is supported in a predetermined position in cleaning engagement with said conveyor by said head support and said latch and may be freely retracted movement of said support head to such a retracted position for cleaning or replacement of said cleaning head upon release of said latch.

2. The invention as in claim 1 wherein said head support is pivotally mounted for free swinging movement between said engagement and retracted positions.

3. The invention as in claim 1 wherein said cleaning head is removably mounted on said head support for removal and replacement while said head support is in said retracted position.

4. The invention as in claim 3 wherein said cleaning head is slidably mounted on said head support.

5. The invention as in claim 1 wherein said head support is pivotally mounted for free swinging movement between said engagement and retracted positions about an axis which extends transverse to said predetermined direction, said head support extends upstream from said axis and said cleaning head engages onto said head support from the upstream edge of said head support.

6. The invention as in claim 1 wherein said head support also is mounted for selective adjustment movement of said cleaning head thereon toward and away from said conveyor while said support is in said engagement position.

7. The invention as in claim 6 wherein said head support is mounted for pivoting movement to effect such selective adjustment movement of said cleaning head while said support is in said engagement position.

8. The invention as in claim 1 wherein said cleaning head includes brushes for engaging said conveyor.

9. The invention as in claim 1 wherein said head support is mounted for two modes of movement, one of said modes being said free movement between said retracted position and said engagement position in which it is held by said latch and said second mode is selective adjustment movement of said head support and said cleaning head thereon toward and away from said conveyor while said head support is held in said engagement position by said latch.

10. The invention as in claim 9 wherein said latch and said support head are moved together toward and away from said conveyor in said second mode.

11. The invention as in claim 1 wherein said cleaning head is removably mounted on said head support for removal and replacement while said head support is in said retracted position, said head support having an engagement axis that is disposed generally parallel to said predetermined direction when said head support is in said engagement position, and said cleaning head and said head support being of complementary configurations for sliding engagement of said cleaning head with said support head upon movement of said cleaning head along said engagement axis in a first direction generally parallel to said predetermined direction of movement of such conveyor, said head support precluding movement of said cleaning head laterally relative to said engagement axis of said support head when so engaged therewith, whereby said cleaning head may be so slid onto said head support and then moved into a cleaning position by said head support for contact with said conveyor when said head support is in its engagement position and thereafter may be removed by sliding movement in a direction opposite to said first direction when said head support is in its retracted position.

12. A conveyor cleaning assembly for cleaning an endless conveyor as such conveyor moves in a predetermined direction along a portion of its path of movement, said cleaning assembly comprising:

a cleaning head which includes at least one brush having bristles for engaging one or more surfaces of said conveyor and removing debris therefrom as said conveyor moves along said portion of its path in engagement with said brush, and a support frame adjacent said conveyor, a head support on which said cleaning head is held for holding said cleaning head with said brush thereon in a stationary position adjacent said portion of said path, said head support including a bracket which supports said cleaning head and is pivotally mounted on said support frame for movement between an engagement position on said frame wherein said brush held on said head support is in cleaning engagement with said conveyor and a retracted position on said frame wherein said brush held on said head support is clear of said conveyor, said cleaning head being removably mounted on said head support for removal and replacement while said head support is in said retracted position, means for selectively effecting adjustable positioning of said bracket about said pivotal mounting for moving said cleaning head thereon toward and away from such conveyor for holding said head support in said engagement position and selectively retracting said head support to said retracted position, whereby said brush is supported in a predetermined stationary position in cleaning engagement with said conveyor by said bracket and said means and may be selectively retracted to such a retracted position by said means and said bracket for cleaning or replacement of said brush, and said support frame defining a plurality of spaced discrete pivot attachment locations for said pivotal mounting of said bracket thereon for varying the relationship of said bracket and said cleaning head to such a conveyor in accordance with the length of the bristles of said brush.

13. A conveyor chain cleaning assembly for cleaning an endless conveyor chain as such conveyor chain moves in a predetermined direction along a portion of its path of movement, said chain cleaning assembly comprising:

a section of a rail for carrying a conveyor chain and which defines said portion of the path of such a conveyor chain, a cleaning head which includes at least one cleaning element for engaging one or more surfaces of such a conveyor chain and removing debris therefrom as said conveyor chain moves along said rail section, a head support mounted on said rail section for holding said cleaning head adjacent such a conveyor chain as said chain traverses said rail section, said head support being mounted on said rail section for free movement between an engagement position on said rail section wherein said cleaning head held on said head support is in cleaning engagement with said conveyor chain and a retracted position on said rail section wherein said cleaning head held on said head support is clear of said conveyor chain and said rail section, a latch for selectively holding said head support in said engagement position and releasing said head support for free movement to said retracted position, whereby said cleaning head is supported in a predetermined position in engagement with said conveyor by said latch and may be freely retracted to such a retracted position for cleaning or replacement of said cleaning head upon release of said latch.

14. The invention as in claim 13 wherein said cleaning head includes a brush having bristles which extend transversely of said predetermined direction to engage such a conveyor chain in said rail section when said support with said cleaning head thereon is in said engagement position.

15. The invention as in claim 14 wherein said rail section includes side portions for receiving such a conveyor chain therebetween, said head support being disposed on the outer side of one of said side portions, and wherein said cleaning head includes a base portion which is on the outer side of said one of said side portions when said head support with said cleaning head thereon is in said engagement position, said brush having bristles which traverse said side section to engage such a conveyor chain in said rail section when said support with said cleaning head thereon is in said engagement position.

16. The invention as in claim 14 which includes such a head support with such a cleaning head thereon on each side of said rail section.

17. The invention as in claim 13 wherein said section of a rail is a discrete short section having terminal ends whereby said rail section with said cleaning head, said head support and said latch thereon may be inserted as a unit within a conveyor chain rail of indeterminate length.

18. A conveyor cleaning assembly for cleaning an endless conveyor as such conveyor moves in a predetermined direction along a portion of its path of movement, said cleaning assembly comprising:

a cleaning head which includes at least one cleaning element for engaging one or more surfaces of said conveyor and removing debris therefrom as said conveyor moves along said portion of its path in frictional engagement with said cleaning element, a head support for holding said cleaning head adjacent said portion of said path, said head support being mounted for free movement between an engagement position wherein said cleaning head held thereon is in engagement with said conveyor and a retracted position wherein said cleaning head held thereon is clear of said conveyor, said cleaning head being removably mounted on said head support for removal and replacement while said head support is in said retracted position, said head support having an engagement axis that is disposed generally parallel to said predetermined direction when said head support is in said engagement position, and said cleaning head and said head support being of complementary configurations for sliding engagement of said cleaning head with said support head upon movement of said cleaning head along said engagement axis in a direction corresponding generally to said predetermined direction of movement of such conveyor, said head support precluding movement of said cleaning head laterally relative to said engagement axis of said support head when so engaged therewith, and said cleaning head and said head support including abutment portions which limit the sliding engagement movement of said cleaning head onto said support head in said direction of movement of said conveyor, whereby said cleaning head may be so slid onto said support and into a cleaning position for contact with said conveyor and thereafter retained in such cleaning position by friction forces of said conveyor on said cleaning head as said conveyor moves in said predetermined direction and said cleaning head may be removed by sliding movement opposite to said predetermined direction, and a latch for selectively holding said head support in said engagement position and releasing said head support for free movement to said retracted position, whereby said cleaning head is supported in a predetermined position in engagement with said conveyor by said latch and may be freely retracted to such a retracted position for cleaning or replacement of said cleaning head upon release of said latch.

19. The invention as in claim 18 wherein said head support is pivotally mounted for free swinging movement between said engagement and retracted positions about an axis which extends transverse to said predetermined direction, wherein said head support extends upstream from said axis and said cleaning head engages onto said head support from the upstream edge of said head support.

20. A conveyor cleaning assembly for cleaning an endless conveyor as such conveyor moves in a predetermined direction along a portion of its path of movement, said cleaning assembly comprising:

a cleaning head which includes at least one cleaning element for en a in one or more surfaces of said conveyor and removing debris therefrom as said conveyor moves along said portion of its path in frictional engagement with said cleaning element, a head support for holding said cleaning head adjacent said portion of said path, said head support being mounted for free movement between an engagement position wherein said cleaning head held thereon is in engagement with said conveyor and a retracted position wherein said cleaning head held thereon is clear of said conveyor, said head support being pivotally mounted for free swinging movement about a first axis for such movement between said engagement and retracted positions and also mounted for selective adjustment movement about a second axis for adjustment movement of said cleaning head thereon toward and away from said conveyor, said second axis being substantially orthogonal to said first axis, and a latch for selectively holding said head support in said engagement position and releasing said head support for free movement to said retracted position, whereby said cleaning head is supported in a predetermined position in engagement with said conveyor by said latch and may be freely retracted to such a retracted position for cleaning or replacement of said cleaning head upon release of said latch.

21. The invention as in claim 20 wherein said cleaning head includes brushes for engaging said conveyor.

22. A conveyor cleaning assembly for cleaning an endless conveyor as such conveyor moves in a predetermined direction along a portion of its path of movement, said cleaning assembly comprising:

a cleaning head which includes at least one brush for engaging one or more surfaces of said conveyor and removing debris therefrom as said conveyor moves along said portion of its path in engagement with said brush, and a support frame adjacent said conveyor, a head support for holding said cleaning head with said brush thereon in a stationary position adjacent said portion of said path, said head support being mounted on said support frame for movement between an engagement position on said frame wherein said brush held on said head support is in cleaning engagement with said conveyor and a retracted position on said frame wherein said brush held on said head support is clear of said conveyor, and said head support having an engagement axis that is disposed generally parallel to said predetermined direction when said head support is in said engagement position, said cleaning head and said head support being of complementary configurations for sliding engagement of said cleaning head with said head support upon movement of said cleaning head along said engagement axis in a direction generally parallel to said predetermined direction of movement of such conveyor, said head support precluding movement of said cleaning head laterally relative to said engagement axis of said support head when so engaged therewith, and said cleaning head being held in a stationary position in said slide engagement with said head support, whereby said cleaning head may be so engaged onto said head support and moved into a cleaning position by said head support for contact with said conveyor when said head support is in its engagement position and thereafter may be removed by sliding movement in a direction generally parallel to said predetermined direction of movement of said conveyor when said head support is in its retracted position, means for selectively holding said head support in said engagement position and selectively retracting said head support to said retracted position, whereby said brush is supported in a predetermined stationary position in cleaning engagement with said conveyor by said head support and said means and may be selectively retracted to such a retracted position by said means and said head support for cleaning or replacement of said brush.

23. The invention as in claim 22 wherein said head support includes a bracket which supports said cleaning head and is pivotally mounted on said support frame, said means for selectively holding and retracting said head support effecting adjustable positioning of said bracket about said pivotal mounting thereof for moving said cleaning head thereon toward and away from such conveyor, and said support frame defining a plurality of spaced discrete pivot attachment locations for said pivotal mounting of said bracket thereon for varying the relationship of said bracket and said brush to such a conveyor.

24. A conveyor chain cleaning assembly for cleaning an endless conveyor chain as such conveyor chain moves along a portion of its path of movement, said chain cleaning assembly comprising:

a section of a rail for carrying a conveyor chain which defines said portion of the path of such a conveyor chain, a brush assembly supported adjacent said rail for cleaning a portion of such a conveyor chain as such chain so moves along said section of said rail, said brush assembly including a plurality of brushes each having a base that is spaced from said section of said rail and bristles extending from said base toward said section of said rail generally parallel to a bristle axis, and said brushes being disposed with their bristle axes in mutually convergent relation with one another toward said rail section for engaging multiple surfaces of a chain as such chain moves along said section of said rail.

25. The invention as in claim 24 wherein each of said brushes is elongated in a direction generally parallel to said section of said rail.

26. The invention as in claim 24 wherein said brush assembly comprises a brush support which includes a center portion and two diverging side portions, at least three brushes mounted within said brush support and including a center brush mounted on said center portion and two brushes mounted on said diverging side portions, wherein the bristles of said three brushes converge relative to one another.

27. The invention as in claim 26 wherein said brush support is of truncated generally triangular section comprising a generally flat center portion, each of said diverging portions including a flange at its distal edge, said flanges diverging at a greater angle than the portions of said side walls which are proximal to said center portion, said two brushes being mounted on said flange portions.

28. The invention as in claim 26 including an adjustable mounting mechanism supporting said brush support and being adjustable for selectively altering the position of said brushes relative to said rail section.

29. A conveyor chain cleaning assembly for cleaning an endless conveyor chain as such conveyor chain moves in a predetermined direction along a portion of its path of movement, said chain cleaning assembly comprising:

a section of a rail for carrying a conveyor chain and which defines said portion of the path of such a conveyor chain, said rail section including side portions for receiving such a conveyor chain therebetween, a cleaning head which includes at least one brush for engaging one or more surfaces of such a conveyor chain and removing debris therefrom as said conveyor chain moves along said rail section, a head support, on which said cleaning head is held, mounted on said rail section for holding said cleaning head adjacent such a conveyor chain as said chain traverses said rail section, said head support being mounted for free movement on said rail between an engagement position wherein said brush held thereon is in engagement with said conveyor chain and a retracted position wherein said brush held thereon is clear of said conveyor chain, said head support being disposed on the outer side of a respective one of said side portions, and wherein said brush is extended through said respective side portion and into cleaning engagement with such a conveyor chain on said rail section when said head support with said cleaning head thereon is in said engagement position, a latch for selectively holding said head support in said engagement position and releasing said head support for free movement to said retracted position, whereby said cleaning head is supported in a predetermined position with said brush in engagement with said conveyor by said head support and said latch and may be freely retracted by movement of said support head to such a retracted position for cleaning or replacement of said brush upon release of said latch.

30. The invention as in claim 29 which includes such a head support with such a cleaning head thereon on each side of said rail section.

31. The invention as in claim 30 which includes a top brush assembly and a bottom brush assembly also mounted on said rail section with bristles of said top and bottom brush assemblies disposed to engage top and bottom portions, respectively, of such a conveyor chain as said chain moves along said rail section.

32. The invention as in claim 31 wherein said top brush assembly includes a plurality of brushes each having bristles extending generally parallel to a bristle axis, and said brushes being disposed with their bristle axes in mutually convergent relation with one another toward said rail section.

33. The invention as in claim 32 wherein each of said brushes is elongated in a direction generally parallel to said predetermined direction.

34. The invention as in claim 31 including means for mounting said head support, cleaning head, latch and top and bottom brush assemblies on such a rail section which is of indeterminate length without severing said rail section and without breaking such a chain which extends through said rail section.

35. The invention as in claim 31 wherein said section of a rail is a discrete short section having terminal ends whereby said rail section with said cleaning head, head support, latch and top and bottom brush assemblies thereon may be inserted as a unit within a conveyor chain rail of indeterminate length.

36. The invention as in claim 31 wherein at least one of said top and bottom brush assemblies includes a brush mounted on the distal end of a cantilever bracket which is pivotally mounted at its proximal end on a support element, means for adjustably positioning said bracket about said pivotal mounting for moving said brush thereon toward and away from such a chain in said rail section, and said support element defining a plurality of spaced discrete pivot attachment locations for said pivotal mounting of said bracket thereon for varying the relationship of said bracket and brush thereon to such a chain in said rail section.

* * * * *

UNITED STATES PATENT AND TRADEMARK OFFICE
CERTIFICATE OF CORRECTION

PATENT NO.    : 5,671,838
DATED         : September 30, 1997
INVENTOR(S)   : John H. BOWMAN It is certified that errors appear in the above-identified patent and that said Letters Patent is hereby corrected as shown below:

On the Title Page:

Under "References Cited," Line 3: "575,520 11/1897" should read --575,520 1/1897--.

Column 2, line 13, "Trac" should read --Track--.

In the Claims:

Claim 1, column 9, line 37: "retracted movement" should read --retracted by movement--.

Claim 20, column 12, line 57: "en a in" should read --engaging--.

Signed and Sealed this

Fourth Day of July, 2000

*Attest:*

Q. TODD DICKINSON

*Attesting Officer*       *Director of Patents and Trademarks*